(12) United States Patent
Leon et al.

(10) Patent No.: US 6,562,477 B1
(45) Date of Patent: May 13, 2003

(54) HEAT SEALING COMPOSITION, USE THEREOF AND CLOSURE PLUG MADE FROM SAID COMPOSITION

(75) Inventors: Jean-Pierre Leon, Joffre (FR); Jean Michel Pierrot, Crosley sur Risle (FR); Philippe Vigouroux, Allee des Arcades (FR)

(73) Assignee: Rapid S.A., Puiseux Pontoise (FR)

( * ) Notice: Subject to any disclaimer, the term of this patent is extended or adjusted under 35 U.S.C. 154(b) by 0 days.

(21) Appl. No.: 09/744,201

(22) PCT Filed: Jul. 19, 1999

(86) PCT No.: PCT/FR99/01758

§ 371 (c)(1),
(2), (4) Date: May 2, 2001

(87) PCT Pub. No.: WO00/05320

PCT Pub. Date: Feb. 3, 2000

(30) Foreign Application Priority Data

Jul. 21, 1998 (FR) .............................................. 98 09310

(51) Int. Cl.$^7$ ........................... B32B 27/00; B32B 3/02; C08L 53/00
(52) U.S. Cl. .................... 428/500; 428/411.1; 428/413; 428/66.4; 428/522; 277/637; 525/88; 525/89
(58) Field of Search .............................. 525/50, 55, 63, 525/88, 89; 428/66.3, 66.4, 411.1, 413, 500, 520, 522, 424.3; 24/297, 625; 277/637

(56) References Cited

U.S. PATENT DOCUMENTS

| | | | |
|---|---|---|---|
| 3,760,031 A | 9/1973 | Sato et al. .................... | 260/836 |
| 4,602,056 A | 7/1986 | Waniczek et al. ............ | 524/272 |
| 5,550,190 A * | 8/1996 | Hasegawa et al. ........... | 525/173 |
| 5,852,854 A | 12/1998 | Pierrot et al. ................. | 24/297 |
| 6,239,219 B1 * | 5/2001 | Breant et al. ................ | 524/386 |

FOREIGN PATENT DOCUMENTS

| | | |
|---|---|---|
| DE | 197 45 701 | 4/1999 |
| EP | 0 288 819 | 7/1987 |
| EP | 0 345 069 | 12/1989 |
| EP | 0 733 558 | 9/1996 |
| EP | 0 779 307 | 6/1997 |
| FR | 2 399 954 | 3/1979 |

* cited by examiner

*Primary Examiner*—Robert Dawson
*Assistant Examiner*—Michael Feely
(74) *Attorney, Agent, or Firm*—Leydig, Voit & Mayer, Ltd.

(57) ABSTRACT

The invention concerns a heat sealing composition including an adhesive framework and a framework forming constituent, the adhesive constituent being a maleic vinyl-anhydride ethylene-acetate polymer or a vinyl ethylene-acetate polymer modified to have epoxy functions and the framework forming constituent being selected from among a block polyether amide, modified or not, and a block polyether ester. The composition is useful for making closure plugs.

24 Claims, 7 Drawing Sheets

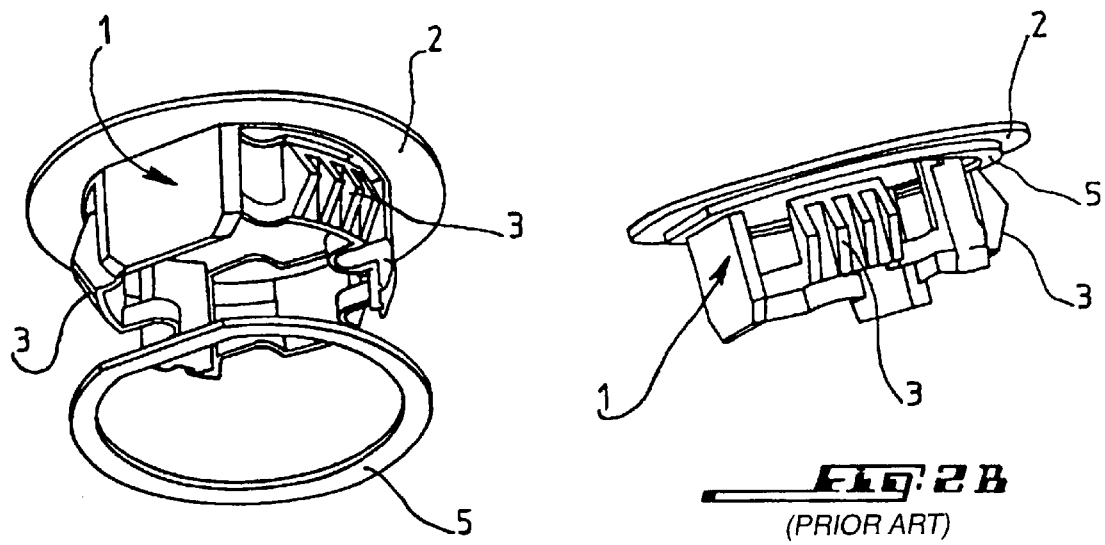
FIG. 2A
(PRIOR ART)
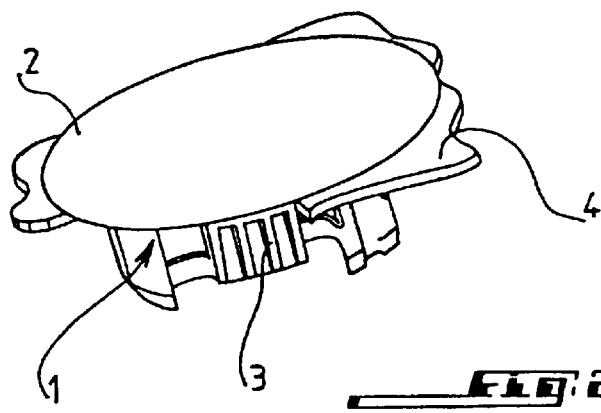
FIG. 2B
(PRIOR ART)
FIG. 2C
(PRIOR ART)
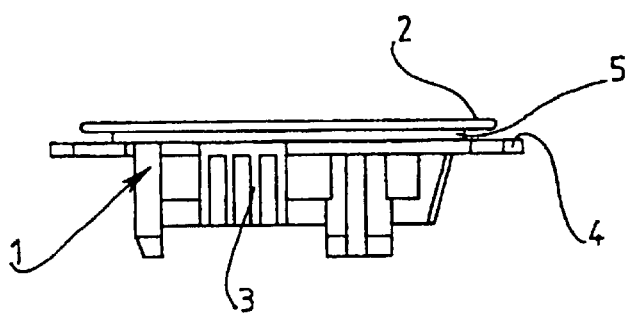
FIG. 2D
(PRIOR ART)

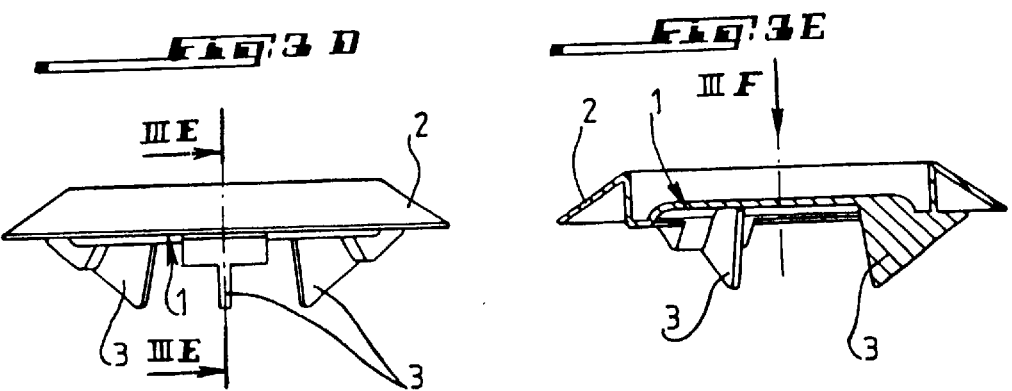
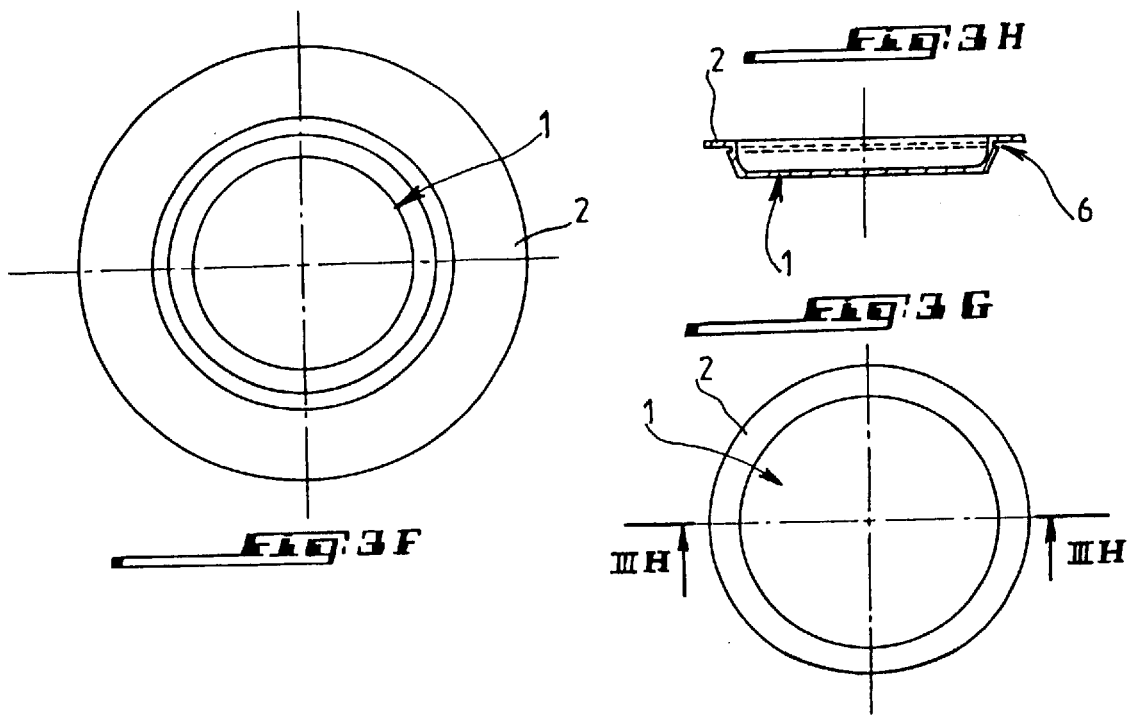
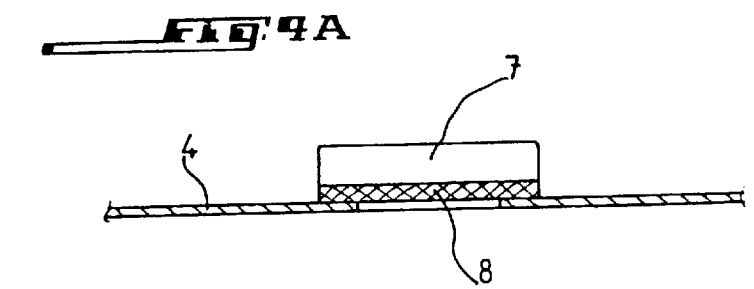
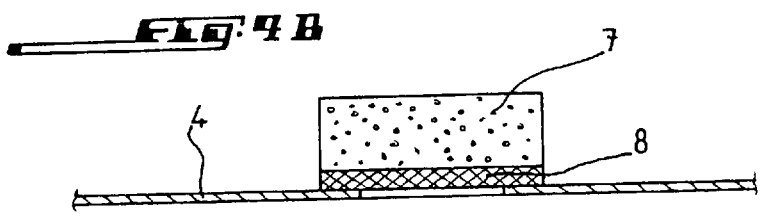

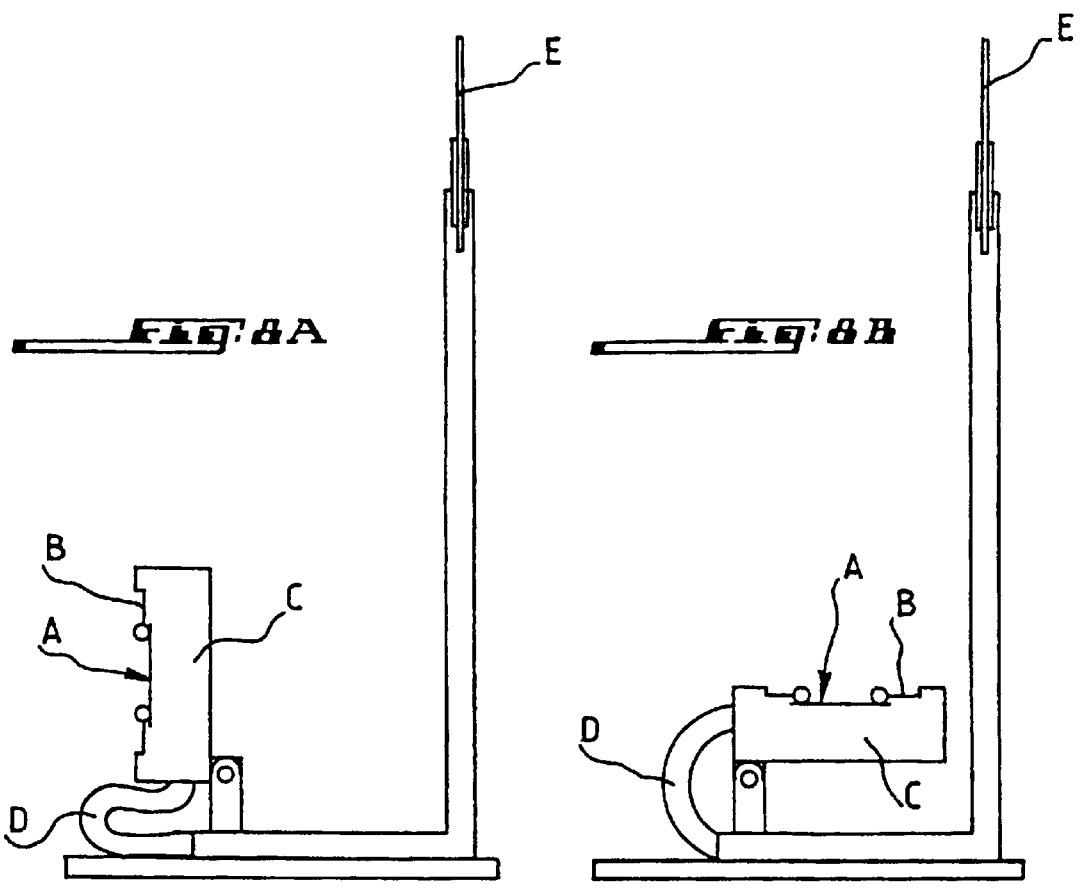
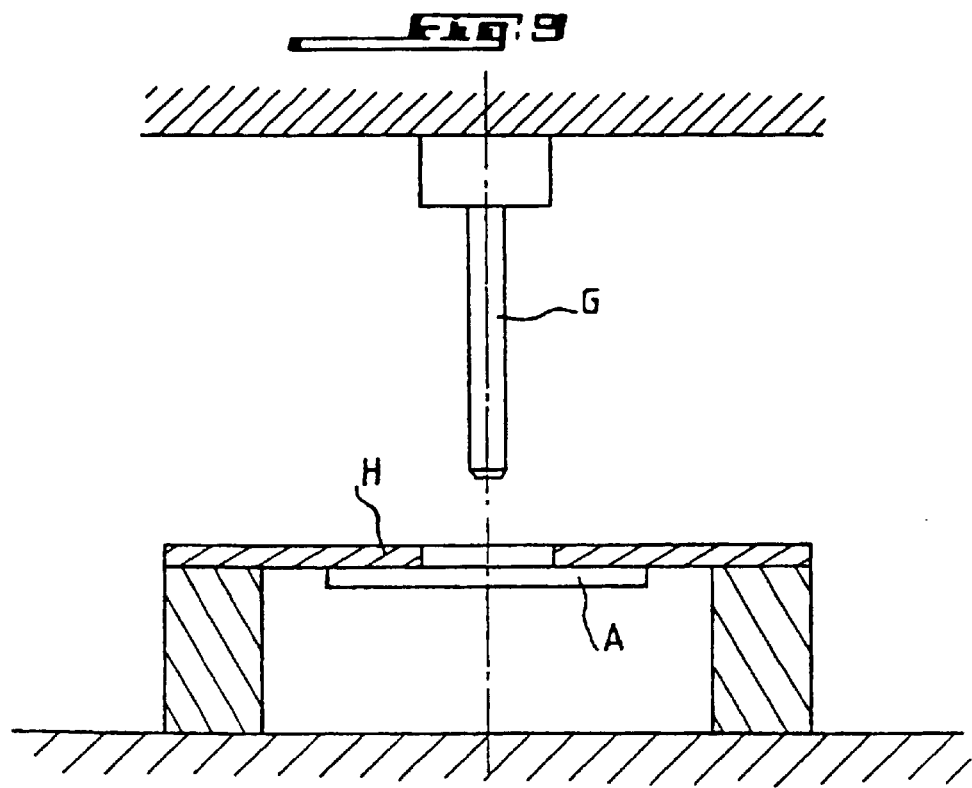

HEAT SEALING COMPOSITION, USE THEREOF AND CLOSURE PLUG MADE FROM SAID COMPOSITION

The invention relates to a thermogluing composition as well as to its use, in particular for the manufacture of a closing stopper for any opening.

It also concerns a closing stopper for any opening consisting of the thermogluing composition of the invention.

Closing devices have already been proposed to stopper any opening, and, in particular, an opening in a metal part.

For example, closing devices have already been proposed which consist of a plastic material based on polyethylene (PE) and polypropylene (PP), or a mixture of polypropylene and an ethylene-propylene-diene terpolymer (PP/EPDM).

Such a closing device consists of a body made of the desired plastic material having the form of the opening to be closed and it comprises a single or double sealing lip which is usually located in the extension of the body of the closing device.

This closing device was placed in the opening to be closed without any subsequent treatment. However, the seal of this closing device against run off water and dust is weak. In addition, when one applies pressure to this closing device in place, the seal is easily broken.

A closing device was then proposed which consists of a steel body and a bead of hot melt deposited on the peripheral surface of the body. Hooking tabs are arranged at the periphery of the body of the closing device in order to maintain this closing device in place. Once the closing device is positioned on the opening, the assembly is subjected to a passage through an oven, and the glue constituting the bead of hot melt melts and hardens during the cooling of the assembly. Thus, the seal between the closing device and the support of the opening has been achieved. The hot melt used is a glue based on a copolymer of ethylene/vinyl acetate (EVA) and its derivatives.

However, the metal body of such a closing device raises problems during its fitting in the opening to be closed because of its hardness and its lack of flexibility.

To avoid the problem caused by the metal body of the closing device itself, closing devices have also been proposed whose body is made of a plastic material and which comprise a bead of hot melt deposited on the peripheral surface of this body.

The seal of the closing device on the support comprising the opening to be closed is achieved in the same manner as above by passage through an oven.

More specifically, such a closing device generally consists of a body made of polyamide 66 or of an alloy of polyamide and of polypropylene, and the bead of hot melt is a bead of glue based on a copolymer of ethylene-vinyl acetate and its derivatives.

This type of closing device with a bead of glue presents a good seal against run off water, dust, and pressure, but its manufacturing method requires a step for manufacturing the body and a step for manufacturing and positioning the bead of glue. This method is thus long and complicated to use, and it requires, in addition, a specific apparatus.

Thus, it is desirable to simplify the method of manufacturing this type of closing device and to improve its reproducibility.

The invention is intended to overcome the above drawbacks of the closing devices of the prior art by proposing a closing device which consists of one and the same material which, at the time of passage through the oven, allows the closing of the opening, for example, of a metal plate, while at the same time achieving the desired seal against run off water, dust and pressure, and which can be manufactured at low cost, by a simple and reproducible method.

To this effect, the invention proposes a thermogluing composition of the type comprising an adhesive component and a component forming a framework, characterized in that:

a) the adhesive compound is a polymer of ethylene-vinyl acetate (EVA)-maleic anhydride and/or polyethylene (PE) and/or polypropylene or modified to have epoxy functions, and b) the component which forms the framework is an ester block polyether (COPE) or an amide block polyether (PEBA) optionally mixed with a copolymer of ethylene/propylene, where said copolymer of ethylene-propylene can be replaced entirely or in part by a terpolymer of ethylene-propylene-diene (EPDM).

According to a characteristic of the composition of the invention, said EVA-maleic anhydride contains 0.5–40 wt % of units of vinyl acetate and 0.05–15 wt % of maleic anhydride, the remainder being ethylene.

More preferably, said EVA-maleic anhydride contains 5–25 wt % of units of vinyl acetate and 0.5–10 wt % of maleic anhydride, the remainder being ethylene. It is most preferred for said EVA-maleic anhydride to contain 14 wt % of units of vinyl acetate and 0.5–1 wt % of maleic anhydride.

In a preferred embodiment variant, the polymer of ethylene-vinyl acetate-maleic anhydride is a copolymer of ethylene-vinyl acetate grafted with maleic anhydride.

When the EVA is modified to have epoxy functions, the epoxy functions are preferably contributed by glycidyl methacrylate.

The EVA then preferably contains 1–10 wt % of units of glycidyl methacrylate.

According to an embodiment variant of the composition of the invention, the component forming the framework is an ester block polyether (COPE) whose ester part consists of poly(butylene terephthalate) (PBTP) and whose ether part consists of units of ethylene glycol and/or propylene glycol.

According to another embodiment variant of the composition of the invention, the framework material is PEBA mixed with a copolymer of ethylene-propylene and/or a terpolymer of ethylene-propylene diene, in which the PEBA consists of blocks of polyamide 6 and ether segments based on ethylene glycol and/or propylene glycol, and the diene of the terpolymer of ethylene-propylene-diene, when present, is butadiene.

Preferably, in the compositions of the invention, the ratio by weight between said active component and said framework forming component is between 80:20 and 70:30.

When the framework forming component is an ester block polyether, the preferred ratio by weight between the adhesive component and the ester block polyether is preferably 60:40.

The preferred ratio by weight between the adhesive component and the framework forming component is 75:25, when the framework forming component is a mixture of PEBA and of a copolymer of ethylene propylene and/or EPDM.

The composition of the invention can, in addition, comprise additives such as resins that are sticky to the touch, fire retardant agents, reinforcement agents, antistatic agents, antifungicides [sic; fungicides], anticoagulation agents, stabilizers against decomposition by light or heat, dyes as well as fillers, alone or in mixtures of several of them.

A preferred composition of the invention comprises in addition to the adhesive component and the framework forming component, a resin which imparts stickiness to the touch at cold temperature.

Preferred resins that impart stickiness to the touch at cold temperature are of the glycol ester type, such as diethylene glycol ester and dipropylene glycol ester.

In this case, the composition of the invention preferably contains 0.2–10 wt % of resin which imparts stickiness to the touch, with reference to the total weight of the composition of the invention.

The invention also proposes a closing stopper for any opening made into a metal support, which [stopper] embraces the composition of the invention.

This closing stopper can consist in its entirety of the composition of the invention.

In particular, this closing stopper comprises a surface having dimensions which are larger than those of the opening to be closed as well as a means for hooking into said opening.

This closing stopper can consist in its entirety of the composition of the invention.

According to a preferred embodiment variant of the closing stopper of the invention, the latter consists of a plate which is made of a material having a melting-decomposition temperature which is higher than the maximum temperature reached during the passage through an oven which is used to glue the stopper to its support, and which has dimensions which are larger than the opening to be closed on at least one of its faces, which plate is coated with a film made of a composition of the invention containing a resin which is sticky to the touch at cold temperature.

In this case, the preferred resin which presents stickiness to the touch at cold temperature is a resin of the glycol ester type. In particular, it is preferable to use a diethylene glycol ester or a propylene glycol ester as resin which presents stickiness to the touch at cold temperature.

In this case, the material constituting the plate can always be a composition of the invention without resin which is sticky to the touch, a metal, an elastomer, a honeycombed elastomer, a rigid plastic, polytetrafluoroethylene, a hot melt composition containing an expansion agent which decomposes at a temperature higher than or equal to 140° C.

According to a characteristic of the closing stopper according to this embodiment variant, the plate has a thickness of 0.5–5 mm, and the film has a thickness of 0.3–3 mm.

The invention also covers the use of the composition of the invention for the manufacture of a stopper to close any opening of any type of support or any other type of industrial product.

The invention will be better understood, and other purposes, characteristics and advantages of the latter will become more apparent in the following detailed description which is made with reference to the drawings in the appendix which are only given as examples, and in which:

FIG. 2A is a bottom view, in perspective, of another closing device according to the prior art comprising a bead of glue which is represented separately in this figure;

FIG. 2B is a perspective view, from below, of the closing device of FIG. 2A represented with the bead of glue in place on the closing device;

FIG. 2C is a perspective view of the top side of the closing device represented in FIG. 2B mounted on a metal support;

FIG. 2D is a side elevation of the closing device visible in FIG. 2C;

FIG. 3D is an elevation view of the closing device of FIG. 3A;

FIG. 3E is a cross-sectional view along the line IIIE—IIIE of FIG. 3D;

FIG. 3F is a top view of the closing device along the arrow IIIF of FIG. 3E;

FIG. 3G is a top view of a variant of the closing device;

FIG. 3H is a cross-sectional view along the line IIIH—IIIH of FIG. 3G, of a variant of the closing device without hooking tab;

FIG. 4A is a cross-sectional side view of another variant of the closing device of the invention;

FIG. 4B is a cross-sectional side view of yet another variant of a closing device of the invention;

FIG. 8A is a diagrammatic elevation view of a testing apparatus which allows the measurement of the water sealing of a closing device tested in the vertical position;

FIG. 8B represents the same testing apparatus to measure the water sealing of a closing device tested in the horizontal position;

FIG. 9 is an elevation and a cross-sectional view of a test apparatus for testing the resistance to detachment, used to test closing devices;

For a better understanding of the invention, closing devices of the prior art will be described first.

Figure 1A:
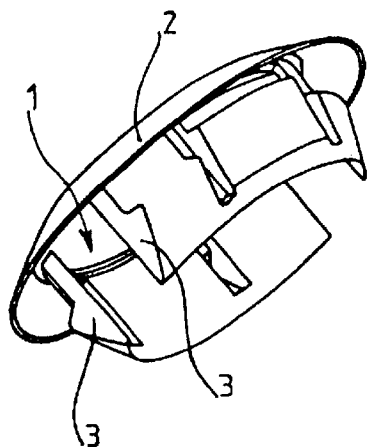
FIG. 1A is a perspective view and a bottom side view of a stopper of the prior art.
Figure 1B:
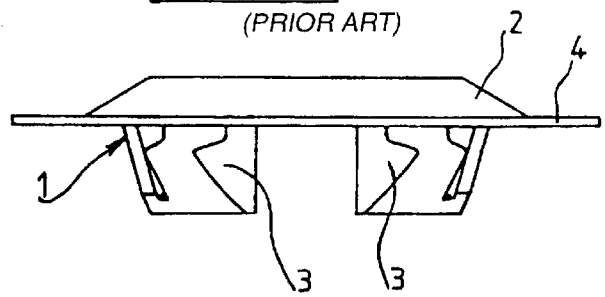
FIG. 1B is a side elevation of the closing device represented in FIG. 1A, but in a position mounted on the metal support.

With reference to FIGS. 1A and 1B, an embodiment example of a single-material closing device of the prior art consists of one and the same plastic material and essentially comprises a sealing lip 2, a body 1, and hooking tabs 3. The body 1 has essentially the same diameter as the opening to be closed in a, preferably metal, support, and the sealing lips 2, as shown in FIG. 1B project above the metal support 4 while the hooking tabs 3 maintain the closing stopper in place by hooking inside the opening and below the metal support 4.

As already stated, such closing device, which is maintained in place only by its hooking tabs, presents only a very weak seal against water and dust, and no pressure seal. Indeed, by simply applying manual pressure, the closing stopper can be made to come out of the opening to be closed.

To solve this sealing problem, another closing device has been proposed in the prior art, as shown in FIGS. 2A, 2B, 2C and 2D. This two-component closing device essentially comprises a body 1 made of plastic material or a metal having essentially the shape and the dimensions of the opening to be closed, sealing lips 2 formed from the same material as the body 1 and having dimensions larger than the opening to be closed, and hooking tabs 3 made of the same material as the body 1 and the sealing lips 2.

As shown in FIG. 2A, this closing device of the prior art comprises, in addition, an annular body of glue 5 represented separately in FIG. 2A and represented in mounted position on the closing device in FIG. 2B. This closing stopper with the mounted annular body of glue is then placed on the opening of the metal support 4 to be closed with the hooking tabs inserted in the opening and maintaining the closing device in position by hooking under the metal support 4. The assembly is then passed through an oven at a temperature which causes the melting of the glue which hardens and adheres to the metal support and to the body of the opening device during the cooling which follows after the removal from the oven.

The glue generally consists of a melt adhesive, also called hot melt in the art, which is an adhesive based on a copolymer of ethylene-vinyl acetate (EVA) and its derivatives. As also already stated, the seal against water, dust and pressure of this closing device is good, but its method of manufacturing is complex, raises problems of reproducibility, and requires special equipment.

In this closing device of the prior art, the body 1 can consist of a metal or a plastic material.

When the body 1 is made of plastic, the materials which are generally used to manufacture this body belong to the polyamide 66 series or the series of alloys of polyamide and polypropylene.

It should be noted that the manufacturing cost of such two-component closing devices is high.

Consequently, there is a need in the prior art for a closing device consisting of a material which can be readily molded in any desired form, which is flexible so that it can easily be inserted in an opening to be closed; which after passage through an oven adheres to the metal support, one opening of which is to be closed, without presenting excessive deformation at high temperatures; and which adheres to any type of support, particularly a metal support.

In other words, the invention is intended to provide a thermogluing composition:

which is easy to use and shape, which undergoes, without chemical alteration, a first heating step for 15–30 min at 140° C. and a second heating step for 30–45 min at 195° C., which are the minimum and maximum time/temperature pairs achieved in ovens that are currently used in the industry to achieve the adhesion of a closing stopper to metal supports, which adheres to any type of support, particularly a metal support, after these heating cycles, which is easy to mold, which does not deform or deforms only little after having been subjected to one or more passages through an oven at the temperatures and for the time periods defined above, and which after the passages through an oven, as defined above, and after having been placed above an orifice to be closed, adheres to the support and does not undergo any deformation, and which presents a seal to water for at least 1 h at a minimum pressure of 0.1 bar.

In addition, this thermogluing composition, after it is molded to form a closing device and is glued to the support, must not lose its quality of adhesion, its water and pressure seal, and it must maintain its shape, even if the temperature to which this closing device is subjected varies from –40° C. to +80° C., a range which represents the conditions of use considered for the metal parts requiring the closing devices of the invention.

The thermogluing composition according to the invention consists of two components, namely an adhesive mixture characterized by a melting temperature less than the minimum temperature of the ovens currently used, that is 140° C., and a second component called "framework material" characterized by a melting point which is higher than the maximum temperature which can currently be achieved in an oven, that is 195° C. The adhesive mixture will make it possible to glue the closing stopper made from the thermogluing composition of the invention to the metal support comprising the opening to be closed, to maintain in place the closing device and to ensure the desired water, dust and pressure seal, while the framework material will make it possible to substantially maintain the shape and the dimensions of the closing stopper made from the thermogluing composition of the invention, during the operation of melting the adhesive and thus gluing the closing stopper to the metal support.

After numerous tests on different compositions of the type comprising an adhesive and a framework forming material, it was discovered that a thermogluing composition comprising:

as adhesive mixture, either a copolymer of ethylene-vinyl acetate (EVA)-maleic acid, optionally also modified with polyethylene and/or polypropylene, or a copolymer of ethylene/vinyl acetate modified to have epoxy functions and as framework component, either an amide block polyether (PEBA) optionally modified by a copolymer of ethylene-propylene and/or terpolymer of ethylene-propylene-diene (EPDM), or an ester block polyether (COPE), made it possible to produce a closing device having all the above described required properties.

In the composition of the invention, the adhesive mixture used is the copolymer ethylene-vinyl acetate-maleic anhydride obtained either by a direct polymerization of the starting monomers, or by grafting of the desired quantity of maleic anhydride to the copolymer of ethylene/vinyl acetate.

In addition, this polymer can optionally be modified with polyethylene and polypropylene, which themselves may optionally be grafted with maleic anhydride.

Different tests were carried out to demonstrate the superior properties of the composition of the invention in comparison to compositions which do not enter in the context of the invention Thus, different compositions comprising different adhesives and different framework materials as shown in Table 1 below were first tested with regard to deformation at high temperature. These tests are carried out on rectangular platelets having dimensions, before the test, of 50 mm×40 mm, and a thickness of 2.0 mm. First, these platelets were placed on a perforated metal plate. The hole of the metal plate is oblong and has the dimensions 20 mm×40 mm, as shown in FIG. 5.

The specimens, each having the composition shown in Table 1, were each placed on a perforated plate and passed through an oven, first at low temperature, that is 140° C., for 30 min, and then at high temperature, that is 195° C. for 30 min, which are the time/temperature pairs chosen as representative of those currently used.

A visual evaluation was then carried out:
1) If, after each of these thermal treatment cycles, the composition maintains a sufficient viscosity so as not to flow through the perforated plate;
2) If the adhesion to the metal support constituted by the perforated plate is sufficient;
3) If the shrinkage is acceptable for the desired closing function (seal maintained);
4) If the deflection of the specimen through the hole is acceptable.

Figure 5:
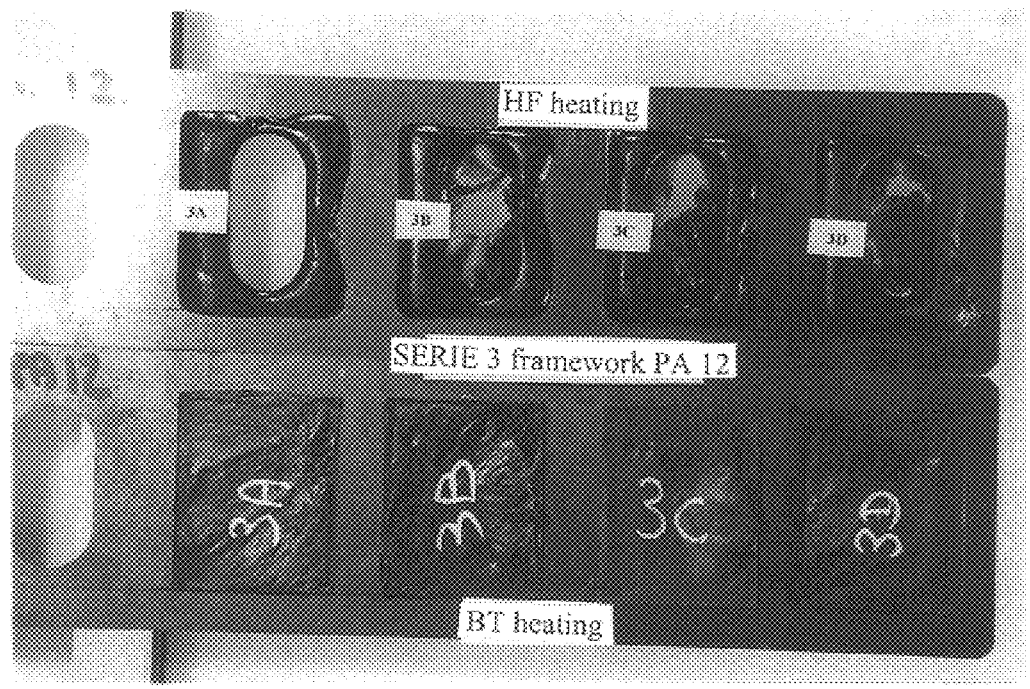
FIG. 5 is a photograph illustrating the results of temperature resistance tests carried out on a thermogluing composition which does not enter in the context of the invention.

FIG. 5 is a photograph of the results of these tests carried out on specimens whose composition does not enter in the context of the invention.

Thus, one can note that these compositions which do not enter in the context of the invention do not succeed in producing, at the time of a passage through an oven at 195° C. for 30 min, the desired closure function since all the specimens have melted and passed through the oblong [perforation] of the perforated plate.

The ratio by weight of the adhesive to the framework component was 25:75 for each one of these samples.

The different adhesives tested are:
A: Copolymer of ethylene-vinyl acetate, noted EVA in Table 1.
B: Copolymer of ethylene-vinyl acetate grafted with maleic anhydride, noted B in Table 1. This adhesive is the one selected in the invention, because it is the one with which the best results are obtained when it is used with the framework composition selected in the invention, as proven by the results of different tests which will be explained below.
C: Copolymer of ethylene-acrylic ester.
D: Terpolymer of ethylene-acrylic ester-maleic anhydride.

Different framework components are also tested in a mixture with each one of the above adhesives. These framework components are the following:
1. Polyamide 6, noted PA 6 in Table 1.
2. Polyamide 66, noted PA 66 in Table 1.
3. Polyamide 11, noted PA 11 in Table 1.
4. Amide block polyether, noted PEBA in Table 1. It is one of the framework components selected in the composition of the invention.
5. Alloy of polyamide and polypropylene noted alloy PA/PP in Table 1.
6. Polyoxymethylene noted POM in Table 1.
7. Mixture of propylene and of a terpolymer of ethylene-propylene-diene, noted PP/EPDM in Table 1.
8. Ester block polyether noted COPE in Table 1. This framework component is one of those selected from the composition of the invention.
9. Terpolymer of acrylonitrile-butadiene-styrene, noted ABS in Table 1.

Each one of the tested compositions was referenced by a numeral followed by a capital letter. This numeral corresponds to the nature of the framework component as identified above and the capital letter corresponds to the adhesive as identified above.

Thus, the sample 1A is a sample prepared from a composition comprising 75 wt % of a copolymer of ethylene-vinyl acetate and 25 wt % of polyamide 6, and sample 4D corresponds to a composition comprising 75 wt % of a copolymner of ethylene-vinyl acetate grafted with maleic anhydride as adhesive and 25 wt % of amide block polyether as framework component.

These references are used throughout the entire description given below, and in the tables which follow, and they always represent the same compositions.

Table 1 below shows each one of the compositions so tested.

TABLE 1

| framework | Adhesive | EVA A | EVA modified with maleic anhydride, B | Copolymer ethylene-acrylic ester, C | Terpolymer ethylene-acrylic ester-maleic anhydride, D |
|---|---|---|---|---|---|
| PA 6 | 1 | 1A | 1B | 1C | 1D |
| PA 66 | 2 | 2A | 2B | 2C | 2D |
| PA 11 | 3 | 3A | 3B | 3C | 3D |
| PEBA | 4 | 4A | 4B | 4C | 4D |
| Alloy PA/PP | 5 | 5A | 5B | 5C | 5D |
| POM | 6 | 6A | 6B | 6C | 6D |
| PP/EPDM | 7 | 7A | 7B | 7C | 7D |
| COPE | 8 | 8A | 8B | 8C | 8D |
| ABS | 9 | 9A | 9B | 9C | 9D |

The results of the visual observations that were carried out on each of the samples shown in Table 1 after passage through the oven for 30 min at 140° C., and then passage through the oven for 30 min at 195° C., are regrouped in Table 2 below.

TABLE 2

| | After 30 min. at 140° C. | | | | | After 30 min. at 195° C. | | | | |
|---|---|---|---|---|---|---|---|---|---|---|
| Sample | Passage through the plate | Adhesion | Shrinkage | Deflection | Other observations | Passage through the plate | Adhesion | Shrinkage | Deflection | Other observations |
| 1A | No | Poor | Moderate | Not measured | Not sealing | No | Good | Weak | Acceptable | Turns yellow |
| 1B | No | Acceptable | Moderate | Not measured | | No | Good | Weak | Acceptable | Turns yellow |
| 1C | No | Acceptable | Moderate | Not measured | | No | Good | Weak | Acceptable | Turns yellow |
| 1D | No | Poor | Strong | Not measured | Not sealing | No | Good | Strong | Acceptable | Turns yellow |
| 2A | No | Acceptable | Weak | Not measured | | No | Good | Weak | Acceptable | |

TABLE 2-continued

| | After 30 min. at 140° C. | | | | | After 30 min. at 195° C. | | | | |
|---|---|---|---|---|---|---|---|---|---|---|
| Sample | Passage through the plate | Adhesion | Shrinkage | Deflection | Other observations | Passage through the plate | Adhesion | Shrinkage | Deflection | Other observations |
| 2B | No | Acceptable | Strong | Not measured | | No | Good | Strong | Acceptable | |
| 2C | No | Acceptable | Weak | Not measured | | No | Good | Weak | Acceptable | |
| 2D | No | Acceptable | Moderate | Not measured | | No | Good | Strong | | |
| 3A | No | Acceptable | Weak | Not measured | | Yes | | Not Measurable | | |
| 3B | No | Acceptable | Weak | Not measured | | Yes | | Not Measurable | | |
| 3C | No | Acceptable | Weak | Not measured | | Yes | | Not Measurable | | |
| 3D | No | Acceptable | Weak | Not measured | | Yes | | Not Measurable | | |
| 4A | No | Acceptable | Strong | | No change in color | No | Good | Very weak | High | Yellow color |
| 4B | No | Acceptable | Weak | | No change in color | No | Good | Weak | Acceptable | Yellow color |
| 4C | No | Acceptable | Weak | | No change in color | No | Good | Weak | Acceptable | Yellow color |
| 4D | No | Acceptable | Strong | | No change in color | No | Good | Strong | Weak | Yellow color |
| 5A | No | Acceptable | Weak | Acceptable | No change in color | No | Good | Weak | Acceptable | Pink |
| 5B | No | Acceptable | Weak | Acceptable | No change in color | No | Good | Weak | High | Pink |
| 5C | No | Acceptable | Strong | High | No change in color | No | Good | Strong | High | Pink |
| 5D | No | Acceptable | Strong | High | No change in color | No | Good | Moderate | Weak | Pink |
| 6A | No | Acceptable | None | Zero | | Yes | | Not measurable | | |
| 6B | No | Acceptable | None | Zero | | Yes | | Not measurable | | |
| 6C | No | Acceptable | None | Zero | | Yes | | Not measurable | | |
| 6D | No | Acceptable | None | Zero | | Yes | | Not meaurable | | |
| 7A | Yes | | | | | Yes | | Not meaured | | |
| 7B | No | Acceptable | Moderate | High | | Yes | | Not meaured | | |
| 7C | Yes | | | | | Yes | | Not meaured | | |
| 7D | Yes | | | | | Yes | | Not meaured | | |
| 8A | No | Zero | | | | No | Acceptable | Very weak | Zero | |
| 8B | No | Acceptable | Very weak | Zero | | No | Acceptable | Very weak | Zero | |
| 8C | No | Zero | Very weak | Zero | | No | Acceptable | Very weak | Zero | |
| 8D | No | Acceptable | Very weak | Zero | | No | Acceptable | Very weak | Zero | |
| 9A | No | Acceptable | Moderate | Very high | | Yes | | Not measured | | |
| 9B | No | Acceptable | Strong | Moderate | | Yes | | Not measured | | |
| 9C | No | Acceptable | Strong | Moderate | | Yes | | Not measured | | |
| 9D | No | Acceptable | Strong | Moderate | | Yes | | Not measured | | |

As one can see from Table 2, the compositions in which the framework material is polymide 11, a mixture of polypropylene and of a terpolymer of ethylene-propylene-diene or of acrylonitrile-butadiene-styrene, cannot be used because they melt during the passage through the oven either at low or at high temperature.

The shrinkage measurements were only carried out on the remaining samples, that is the samples in which the framework was either PA 6 (series 1A–1D), or PA 66 (series 2A–2D), or PEBA (series 4A–4D), or a mixture of polyamide and polypropylene (series 5A–5D), or of COPE (series 8A–8D).

Figure 10:
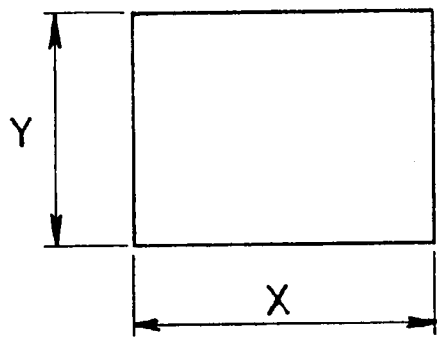
FIG. 10A is a diagrammatic view of a specimen, before passage through an oven, for the determination of the shrinkage of the composition.
FIG. 10B is a diagrammatic plan view of a specimen after passage through an oven, for the measurement of the shrinkage of the composition.
Figure 10:
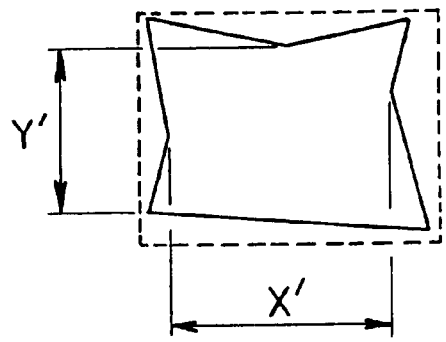

On these samples, one in fact measures the post-shrinkage as shown in FIGS. 10A and 10B. The post-shrinkage is the difference between the dimensions of the injected part cooled to ambient temperature and the dimensions of this part after a recooking at a given temperature for a certain time. Here, the molded plates measure 50 mm×40 mm and they have a thickness of 2 mm, which means that in FIG. 10A, Y=40 mm and X=50 mm. By then measuring the dimensions Y' and X' as indicated in FIG. 10B, the shrinkage is represented by the formula:

shrinkage=$\Delta X=X-X'$ and $\Delta Y=Y-Y'$.

The shrinkage measurements are only carried out on the platelets that were subjected to the high-temperature cycle, that is heating in an oven for 30 min at 195° C., because it is during this cycle that the most extensive deformations are recorded.

The results of these shrinkage measurements are reported below in Table 3.

The measurements of the shrinkage were not carried out on the samples whose component forming the framework was polyamide 11 (series 3A–3D) because the platelets flowed through the perforation. They also were not carried out on the platelets whose framework was POM, because these platelets flowed through the perforation. In the same manner, these measurements were not carried out when the framework was a mixture of polypropylene and of a terpolymer of ethylene-propylene-diene, for the same reason. Also, these measurements were not carried out on the samples in which the framework was acrylonitrile-butadiene-styrene, for the same reason.

The results of the shrinkage measurements obtained on the samples remaining after the passage through the oven for 30 min at 195° C. are reported in Table 3 below.

TABLE 3

| | X' in mm | Y' in mm | $\Delta X$ in mm | $\Delta Y$ in mm | Som$\Delta$ in mm |
|---|---|---|---|---|---|
| | FRAMEWORK: PA 6 | | | | |
| 1A | 39.40 | 49.22 | 0.60 | 0.78 | 1.38 |
| 1B | 39.40 | 49.05 | 0.60 | 0.95 | 1.55 |
| 1C | 37.75 | 48.65 | 2.25 | 1.35 | 3.60 |
| 1D | 31.41 | 41.22 | 8.59 | 8.78 | 17.37 |
| | FRAMEWORK: PA 66 | | | | |
| 2A | 40.00 | 49.40 | 0.00 | 0.60 | 0.60 |
| 2B | 38.73 | 48.34 | 1.27 | 1.66 | 2.93 |
| 2C | 39.80 | 47.82 | 0.2 | 2.18 | 2.38 |
| 2D | 34.12 | 42.32 | 5.88 | 7.68 | 13.56 |
| | FRAMEWORK: PEBA | | | | |
| 4A | 37.90 | 48.17 | 2.10 | 1.83 | 3.93 |
| 4B | 39.55 | 49.84 | 0.45 | 0.16 | 0.61 |
| 4C | 35.23 | 43.94 | 4.77 | 6.06 | 10.83 |

TABLE 3-continued

|  | X' in mm | Y' in mm | ΔX in mm | ΔY in mm | SomΔ in mm |
|---|---|---|---|---|---|
| 4D | 33.02 | 41.00 | 6.98 | 9.00 | 15.98 |
| FRAMEWORK: alloy PA/PP | | | | | |
| 5A | 35.42 | 46.41 | 4.58 | 3.59 | 8.17 |
| 5B | 35.02 | 44.18 | 4.95 | 5.82 | 10.77 |
| 5C | 31.18 | 41.02 | 8.82 | 8.98 | 17.80 |
| 5D | 34.40 | 44.23 | 5.60 | 5.77 | 11.37 |
| FRAMEWORK: COPE (ester block polyether) | | | | | |
| 8A | 36.26 | 47.95 | 3.74 | 2.05 | 5.79 |
| 8B | 35.09 | 43.52 | 4.91 | 6.48 | 11.39 |
| 8C | 35.72 | 44.63 | 4.28 | 5.37 | 9.65 |
| 8D | 35.87 | 45.55 | 4.13 | 4.45 | 8.58 |

The measurements of the deflection were also carried out on the same samples.

Figure 11:
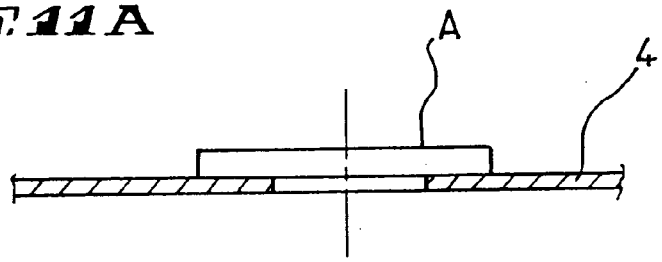
FIG. 11A is a diagrammatic cross-sectional side view of a specimen manufactured from a thermogluing composition, mounted above an opening on a metal support, before passage through an oven.
FIG. 11B is a cross-sectional view similar to FIG. 11A but after passage through an oven, to measure the deflection of tested specimens.
Figure 11:
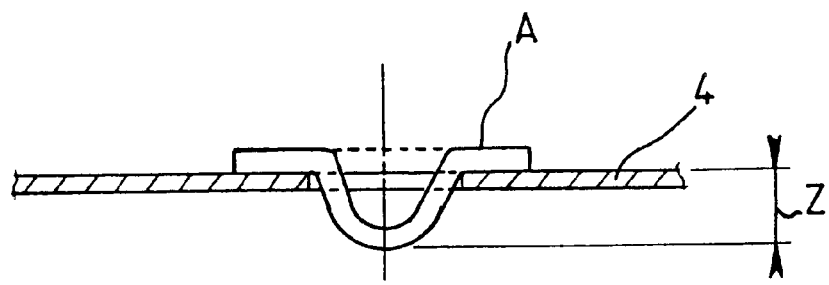

The deflection was measured as shown in FIGS. 11A and 11B.

Thus, a sample specimen noted A manufactured from one of the tested compositions is placed on a metal support 4 and the assembly is passed through the oven. FIG. 11A shows the specimen A on the support 4 before passage through the oven, and FIG. 11B shows the same specimen A on the support 4, after passage through the oven.

The deflection corresponds to the value Z represented in FIG. 11B.

The results, in mm, of this deflection measurement on the samples are reported in Table 4 below in which "B.T." denotes a passage through the oven at low temperature, that is for 30 min at 140°C., "H.T." denotes a passage through the oven at high temperature, that is for 30 min at 195°C., "+deflection" represents the sum of the deflections "B.T." and "H.T.," and "+family" denotes the sum of the "+deflection" per framework family.

TABLE 4

|  | B.T. | H.T. | "+deflection" | "+family" |
|---|---|---|---|---|
| FRAMEWORK: PA 6 | | | | |
| 1A | 0.51 | 0.69 | 1.20 | 11.09 |
| 1B | 1.26 | 2.91 | 4.17 | |
| 1C | 0.00 | 1.63 | 1.63 | |
| 1D | 2.02 | 2.07 | 4.09 | |
| FRAMEWORK: PA 66 | | | | |
| 2A | 0.72 | 1.06 | 1.78 | 23.03 |
| 2B | 3.15 | 6.64 | 9.79 | |
| 2C | 1.01 | 1.21 | 2.22 | |
| 2D | 3.37 | 5.87 | 9.24 | |
| FRAMEWORK: PEBA | | | | |
| 4A | 2.53 | 0.51 | 3.04 | 6.92 |
| 4B | 0.00 | 1.26 | 1.26 | |
| 4C | 0.00 | 0.00 | 0.00 | |
| 4D | 0.6 | 2.02 | 2.62 | |
| FRAMEWORK: alloy PA/PP | | | | |
| 5A | 0.87 | 3.82 | 4.69 | 20.92 |
| 5B | 0.56 | 2.1 | 2.66 | |
| 5C | 2.98 | 3.59 | 6.57 | |
| 5D | 4.86 | 2.14 | 7.00 | |
| FRAMEWORK: COPE (ester block polyether) | | | | |
| 8A | 0.00 | 0.56 | 0.56 | 0.56 |
| 8B | 0.00 | 0.00 | 0.00 | |
| 8C | 0.00 | 0.00 | 0.00 | |
| 8D | 0.00 | 0.00 | 0.00 | |

One can see from the results of Tables 3 and 4 that only the compositions in which the framework is either PEBA (amide block polyether) or COPE (ester block polyether) present the required qualities both in terms of shrinkage and deflection, that is in terms of deformation at high temperature.

However, in the family in which the framework is PEBA, when the adhesive is a copolymer of ethylene-vinyl acetate, the deflection is too high. In the same manner, when the adhesive is a terpolymer of ethylene-acrylic ester-maleic anhydride, the shrinkage is too high to be satisfactory.

Also, one can see from the preceding Tables 1–4 that with the compositions in which the framework is COPE and the adhesive a copolymer of vinyl acetate or a copolymer of ethyleneacrylic ester, there is no adhesion to a metal support.

In conclusion, the only compositions presenting the required properties in terms of resistance to temperature, shrinkage, adhesion and deflection are the specimens whose compositions are as follows: 4B, 4C, 8B and 8D, that is compositions comprising as adhesive a copolymer of ethylene-vinyl acetate grafted with maleic anhydride or a copolymer of ethyleneacrylic ester or a terpolymer of ethylene-acrylic ester-maleic anhydride and, as framework component, either an ester block polyether (COPE) or an amide block polyether (PEBA).

However, to be usable for the manufacture of a closing stopper according to the invention, these compositions must also have the following additional and indispensable properties: suitability for molding into any shape, sealing against water and pressure, and preservation of all the above properties in a temperature range from −40° C. to +80° C.

The four compositions 4B, 4C, 8B and 8D could be molded by known methods of the prior art, but only the compositions 4B and 8B presented an acceptable deformation at high temperature when molded to form closing devices.

The following test therefore was carried out to demonstrate the superiority of these compositions 4B and 8B. Thus, closing devices were obtained by molding to a closing diameter of 40 mm. A closing device manufactured from each of the compositions 4C, 4D, 8B and 8D was prepared.

These sample closing devices are placed on metal plates which are representative of the metal support to which they are preferably applied. These metal supports may or may not have been subjected to a surface treatment, for example, an anticorrosive treatment, such as a cataphoresis coating.

Figure 3A:
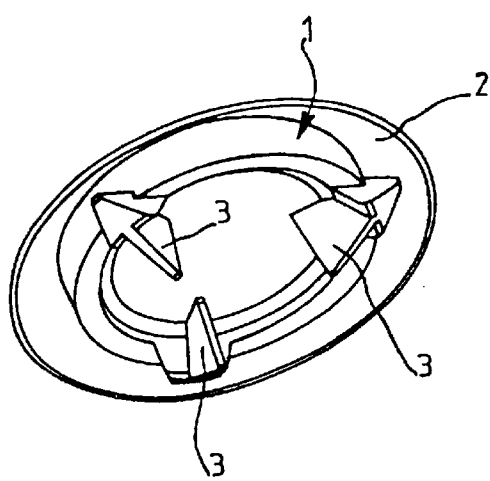
FIG. 3A is a bottom view in perspective of a first embodiment variant of the closing device according to the invention.
Figure 3B:
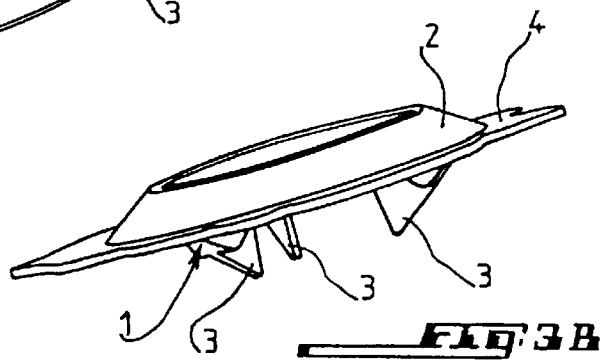
FIG. 3B is a perspective side view of the closing device represented in FIG. 3A mounted on a metal support.
Figure 3C:
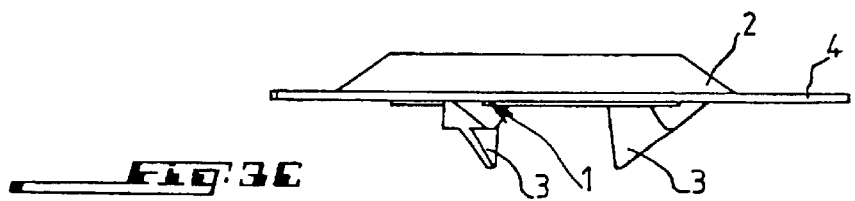
FIG. 3C is a side view of the closing device of FIG. 3B.

As one can see in FIG. 3D, such a single-material closing device is a closing device which comprises hooking tabs 3 and sealing lip 2.

In FIG. 3E, which is a cross-sectional view along the axis IIIE—IIIE of FIG. 3D, one can also see the body 1 which is made of the same material as the hooking tabs 3 and the sealing lip 2.

FIG. 3F represents a top view of the closing device represented in FIGS. 3D and 3E.

Figure 6A:
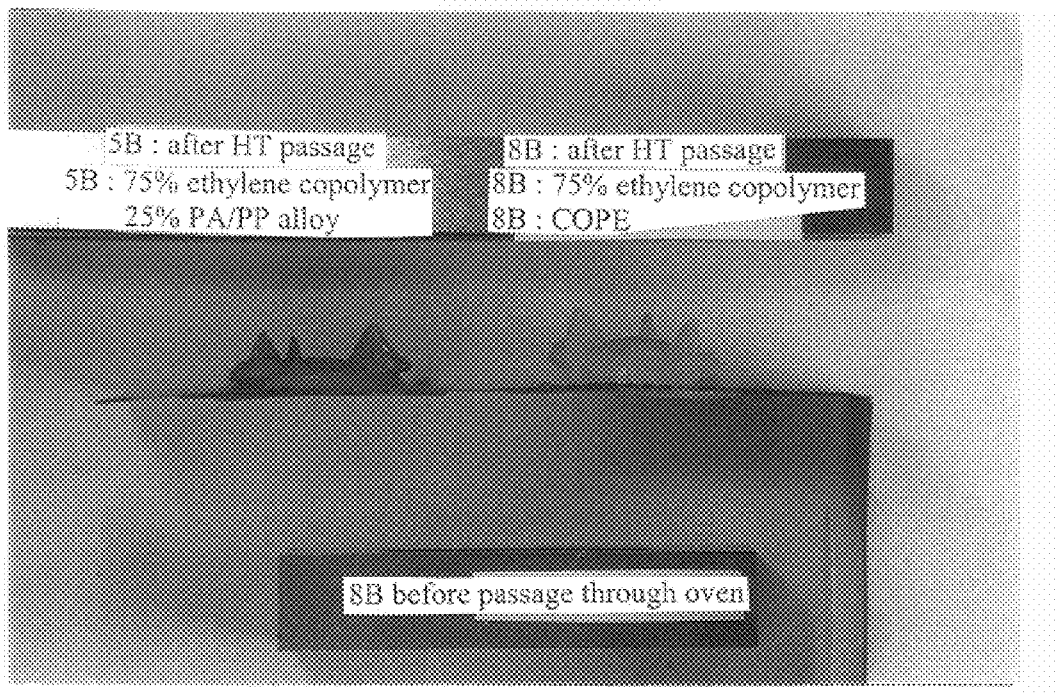
FIG. 6A is a photograph which allows comparing a closing device manufactured with a composition which does not enter in the context of the invention (sample 5B) with a closing device manufactured with a composition according to the invention (sample 8B), after passage through an oven.
Figure 6B:
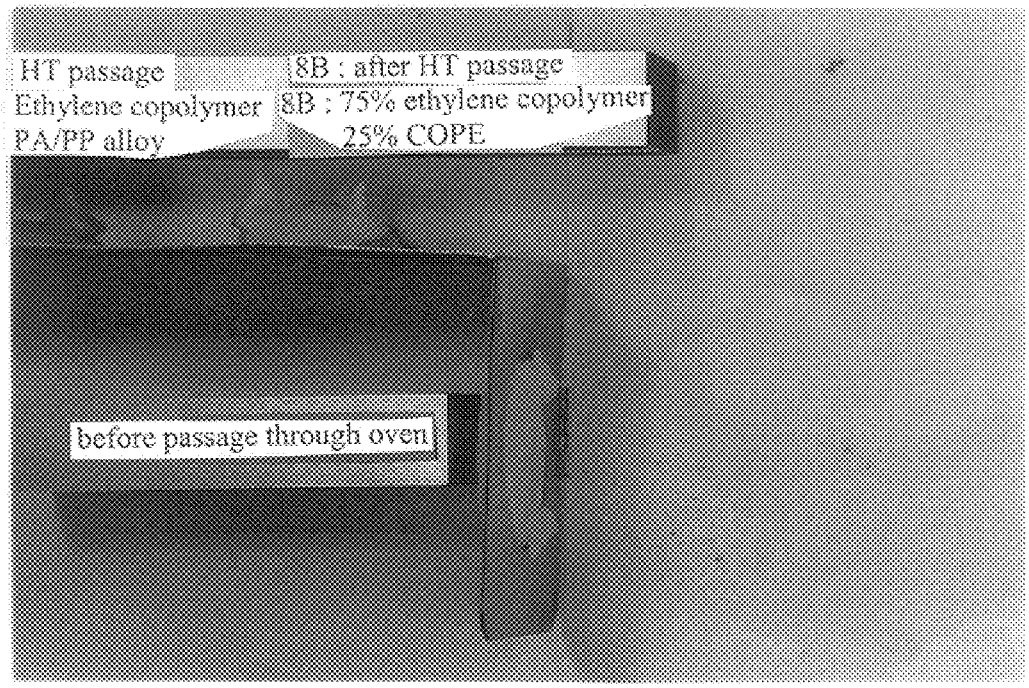
FIG. 6B is a photograph which allows a comparison of a closing device manufactured from a composition which enters in the context of the invention before and after passage through an oven.

FIG. 6B shows the closing device manufactured from the composition 8B mounted on a perforated plate, that is before passage through the oven, while FIG. 6A shows the same closing device after passage through an oven. As one can see, the deformation and the change in color are slight.

In comparison, a sample of the composition 5D is also shown in FIG. 6A. This sample presents a strong deformation and a strong change in color.

Figure 7:
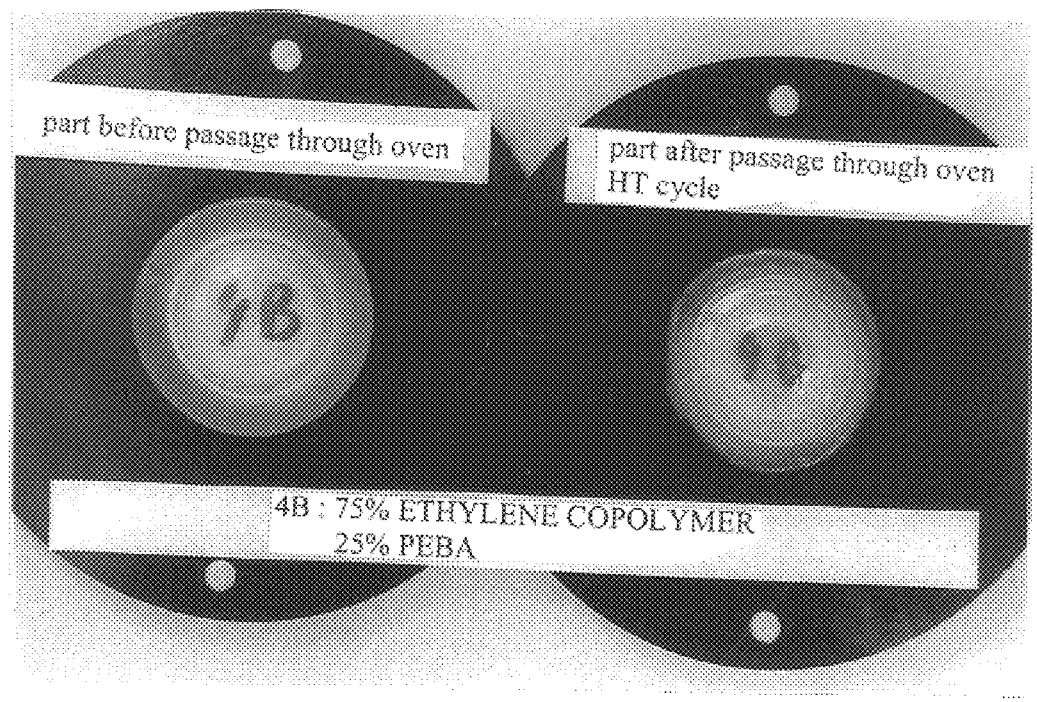
FIG. 7 is a photograph taken from above of another closing device manufactured from another composition which enters in the context of the invention and which is mounted on a support, before passage and after passage through an oven.

Then, each one of the four above mentioned samples is placed on a round perforated plate as shown in FIG. 7 under the name of "part before passage through an oven."

Each one of these samples was then passed through the oven at high temperature, that is for 30 min at 195° C.

As one can see in FIG. 7, the sample 4B presents few deformations after such a temperature cycle.

Each one of the samples 4B, 4C, 8B and 8D was treated in the same manner and, after cooling, the deflections were measured for each one of these samples.

The results of these measurements are reported in Table 5 below.

TABLE 5

| SAMPLE | DEFLECTION |
|--------|------------|
| 4B | 0.00 mm |
| 4C | 11.32 mm |
| 8D | 12.09 mm |
| 8D | 9.36 mm |

A test of the water sealing was then carried out on each specimens subjected to the passage through an oven at high temperature.

This test of the seal against water was carried out as shown in FIGS. 8A and 8B, that is first with the closing device in the vertical position and then with the closing device in the horizontal position.

In this test one subjects, in a vertical position, and then in a horizontal position, the closing device noted A in FIGS. 8A and 8B, to a hydrostatic pressure of 0.1 bar for 1 h to observe the possible existence of leaks.

In FIGS. 8A and 8B, the closing device mounted on the support is noted A, the support is noted B; the vat containing the water and allowing the application of hydrostatic pressure of 0.1 bar is noted C. The reference D represents a flexible connection which brings the water into the vat C, the reference E represents a water column having a 100 cm height which allows the obtention of the pressure of 0.1 bar in the vat C.

To be usable for the purposes of the invention, the closing device must not present any leak after having been exposed for at least 1 h to a hydrostatic pressure of 0.1 bar.

Only the specimens 4B and 8B, that is those manufactured from the compositions of the invention successfully passed this test.

Finally, as mentioned initially, the closing device according to the invention must adhere to its support, which is preferably a metal support.

For this purpose, and to demonstrate again the superiority of the composition of the invention, the resistances to detachment of the closing devices obtained from the compositions 4B and 8B according to the invention and those of the closing devices obtained from compositions that do not enter in the context of the invention, were measured, after passage through an oven at high temperature of these closing devices mounted on a metal plate. The tests were carried out at ambient temperature on an apparatus shown in FIG. 9.

As represented in FIG. 9, a cylindrical punching rod G having a diameter of 10 mm is fixed to one of the plates of a compression machine so that the axis of the rod is perpendicular to the plane of the closing devices A made of the different compositions tested.

The closing device is a plate having the dimensions 50 mm×40 mm, and a thickness of 2 mm, which has been subjected to one cycle in an oven either at low temperature or at high temperature.

The closing device is maintained by the specimen carrier noted H in FIG. 9. It is a steel plate with an oblong perforation having the dimensions 40 mm×20 mm. The thickness of the specimen carrier is 1 mm.

One measures the force required to detach the closing device A from the specimen carrier H.

These tests were carried out on each of the samples of the series 1A–1D, the series 2A–2D, the series 4A–4D, the series 5A–5D and the series 8A–8D.

The results of these tests are reported in Table 6 below.

In this table "B.T." denotes a thermal cycle in an oven at low temperature, that is for 30 min at 140° C., and "H.T." denotes a cycle at high temperature in the oven, that is a 30-min passage at 195° C. and the numerical value reported represents the force required to detach the closing device A.

TABLE 6

| SAMPLE | FORCE AFTER B.T. | FORCE AFTER H.T. |
|--------|------------------|------------------|
| 1A | — | 6.5 daN |
| 1B | 30 daN | 45 daN |
| 1C | 1 daN | 5 daN |
| 1D | — | 10 daN |
| 2A | 3.5 daN | 8.5 daN |
| 2B | >40 daN | >40 daN |
| 2C | 1.5 daN | 3 daN |
| 2D | 5 daN | 9 daN |
| 4A | 3 daN | 9 daN |
| 4B | 5.5 daN | 15 daN |
| 4C | 0.5 daN | 6 daN |
| 4D | 6.5 daN | 13 daN |
| 5A | 12 daN | 20 daN |
| 5B | 13 daN | 25 daN |
| 5C | 11 daN | 4 daN |
| 5D | 4 daN | 4.5 daN |
| 8A | — | 3.5 daN |
| 8B | 14 daN | 24 daN |
| 8C | — | 4 daN |
| 8D | 8 daN | 20 daN |

One can see from the results reported in Table 6 taken in combination with the results reported in Tables 1–5 that the compositions 4B and 8B are the only ones that have all the required properties. The deformation at high temperature (shrinkage, deflection) being a very important criterion, the preferred composition of the invention is the composition 4B.

The sample 4B corresponds to a composition comprising 75 wt % of an adhesive component which is a polymer of ethylene-vinyl acetate grafted with maleic anhydride, comprising 14 wt % of vinyl acetate units, 0.5–1 wt % of maleic anhydride, the remainder being ethylene, and 25 wt % of an amide block polyether whose amide blocks are Nylon® 6, that is polyamide 6 obtained by condensation of ε-caprolactam, and whose ether segments are based on ethylene glycol with a small amount of propylene glycol.

The sample 8B corresponds to a closing device manufactured from a composition containing 75 wt % of an adhesive which is the same polymer of ethylene-vinyl acetate grafted with maleic anhydride as above, and 25 wt % of a framework component which is an ester block polyether whose ester part consists of polybutylene terephthalate and whose ether part consists of units of ethylene glycol.

In this composition, the adhesive component has a melting temperature of 95° C. and the component forming the framework has a melting temperature of 207° C.

Thus, this composition started to present an acceptable adhesion after passage through an oven at 100° C. with the drawback of requiring an increase in the residence time to 1 h. In the same manner, the closing stopper made from this composition maintained its shape after a passage through an oven at 200° C. for 15 min.

Tests were also carried out with a composition still containing as adhesives the same polymer of ethylene-vinyl acetate grafted with maleic anhydride and where the framework component was the same amide block polyether as in the composition 4B, except that it was modified by a copolymer of ethylene-propylene.

The test was also carried out using as adhesive the same polymer of ethylene-vinyl acetate grafted with maleic anhydride and the amide block polyether used for the sample 4B but in a mixture with a terpolymer of ethylene-propylene diene. The results were also excellent.

In the same manner, tests were carried out using as adhesive the same polymer of ethylene-vinyl acetate grafted with maleic anhydride which was in addition modified by a grafting of polyethylene or of polypropylene, and a framework component consisting either of PEBA or of COPE. The results obtained were also excellent.

Tests were also carried out using as adhesive a polymer of ethylene-vinyl acetate-maleic anhydride obtained by the direct polymerization of the constituent monomers and using as framework component either PEBA or COPE. The results obtained were also excellent.

Moreover, the relative proportions of vinyl acetate, of ethylene and of maleic anhydride of the adhesive component were varied. One then observes that the properties of the composition of the invention were always good when the adhesive component contained 0.5–40 wt % of vinyl acetate and 0.5–15 wt % of maleic anhydride, the remainder being ethylene. However, they were slightly better when the adhesive component contained 5–25 wt % of units of vinyl acetate and 0.5–10 wt % of maleic anhydride, the remainder being ethylene.

Outside of the lower and upper weight limits for each of the components, indicated above, the properties of adhesion and maintenance of the shape of the manufactured piece were lost.

However, the preferred adhesive remains the adhesive described for the compositions 4B and 8B.

Tests were also carried out with an adhesive component consisting of a copolymer of ethylene-vinyl acetate not grafted or copolymerized with maleic anhydride but modified, instead, to contain epoxy functions. The results were also good. The best results were obtained when the epoxy functions were contributed by glycidyl methacrylate or an acrylic acid or a methacrylic acid. It is preferred, in this case, to use glycidyl methacrylate at 1–10 wt %.

However, in the most preferred composition of the invention, the adhesive is a copolymer of ethylene-vinyl acetate grafted with maleic anhydride having a content by weight of vinyl acetate units of 14% and a content by weight of maleic anhydride of 0.5–1%, the remainder being ethylene and the preferred amide block polyether used in the invention is an amide block polyether in which the amide blocks consist of polyamide 6 and the ether segments are based on ethylene glycol and/or propylene glycol.

When used in a mixture with the terpolymer ethylene-propylene-diene, the preferred diene is butadiene.

Finally, when the framework component is an ester block polyether as in the composition 8B, the ester part preferably consists of poly(butylene terephthalate) (PBTP) whose ether part consists of units of ethylene glycol and/or propylene glycol.

In the same manner, excellent results were obtained when the ratio by weight of the adhesive component to the framework component varied from 80:20 to 50:50, although, when the framework component is PEBA or a mixture of PEBA with another component as defined above, the preferred ratio by weight is 75:25.

In contrast, when the framework component is an ester block polyether whose ester part consists of polybutylene terephthalate (PBTP) and whose ether part consists of units of ethylene glycol and/or propylene glycol, the preferred ratio by weight of the adhesive component to the framework component is 60:40.

Thus, a composition as defined above presents excellent qualities of heat resistance, pressure sealing, and adhesion to any metal support. The composition of the invention can also contain any required additive which imparts other properties to it.

Such additives are well known in the art and, for example, one can mention: the "tackifying" resins, that is those which impart stickiness to the touch, fire resistant agents, reinforcement materials, volume fillers or antistatic or fungicidal fillers, antioxidants, stabilizers against decomposition in light or heat, or dyes.

The adhesives can be added alone or in mixtures of several adhesives.

They are usually added in quantities of approximately 0.03–5 wt %, but any quantity that confers the desired additional properties to the composition of the invention, without harmful effect on its remarkable properties, can be used.

The preferred fire retardant agents include fire retardant agents of the halogen type, such as tetrabromobenzene, phosphate derivatives such as chloroalkyl phosphates; hydrated alumina or hydrated magnesium oxide.

As reinforcement material used in the invention one can use fibers, flakes or beads made of glass, carbon or mica. The preferred charges are talc, chalk and silica.

The preferred tackifying resins include resins of the phenol terpene type whose addition imparts a stickiness to the touch at low or high temperatures.

As will be seen below, a preferred tackifying resin is a resin that confers stickiness to the touch at cold temperature, of the glycol ester type.

More particularly, a preferred resin which is particularly advantageous is a resin of the ethylene glycol ester or propylene glycol ester type.

A colophony derivative esterified with ethylene glycol or propylene glycol is even more advantageous.

The composition of the invention can thus advantageously be used for the manufacture of closing devices to close any opening in any type of support and in particular in a metal support, and to achieve sealing against water, pressure and dust of this closing device.

This closing device can be as represented in FIGS. 3A–3F which have already been discussed.

However, this closing device can also be as represented in FIGS. 3G and 3H, that is without hooking tab but with a groove 6 provided in the body 1 of the closing device to maintain it in place in the opening.

However, the closing stopper manufactured from the composition of the invention being flexible, the presence of hooking tabs or the presence of a groove is not necessary because the closing stopper of the invention can close the opening and be maintained in place, before passage through an oven by elastic embedding in the opening.

These two types of closing devices represented in FIGS. 3A–3H can be prepared by injection molding of the composition of the invention.

The composition of the invention can be used for injection molding either by simultaneous injection, in the desired proportions, of pellets of the adhesive component and of pellets of the framework forming component and of the desired additives, or by first thoroughly mixing all these components, melting, and reconversion to pellets of the composition formed, followed by the injection of the composition so formed.

Another embodiment variant of the closing stopper of the invention is represented in FIGS. 4A and 4B.

As one can see in these figures, the closing stopper of the invention of the invention [sic] consists of a simple plate 7 having dimensions which are larger than the opening to be closed, plate 7 being coated over at least one of its faces with a film 8 consisting of the composition of the invention containing a resin which is sticky to the touch at cold temperature, such as a resin of the glycol ester type, preferably ethylene glycol ester or propylene glycol ester.

It is preferred that the resin which is sticky to the touch at cold temperature be present in quantities of 0.2–10 wt % with reference to the total weight of the composition.

This embodiment variant is particularly advantageous because the film 8 then presents stickiness at cold temperature and thus ensures the self maintenance of the closing stopper on the support 4 with the opening to be closed, before the passage through an oven.

This film 8 preferably has a thickness of 0.3–3 mm.

The plate 7 which, over at least one of its faces, presents this film 8, can also have a small thickness such as 0.5–5 mm.

Thus, this embodiment variant of the invention presents two additional advantages, the first being that the closing stopper so prepared matches the shape of its support 4 because of its flexibility and the second being that the closing stopper so prepared occupies a small volume in comparison to a conventional closing device.

The plate 7, onto which is placed the film 8, that is, the composition of the invention containing a resin which imparts stickiness to the touch at cold temperature, can be made of any desired material provided that it does not decompose or melt or become excessively viscous at the above defined temperatures of passage through an oven.

Thus, it can consist of a composition of the invention which may or may not contain tackifying resins.

It can also consist of specific materials that impart specific properties to the closing device of the invention.

For example, the plate 7 can be a metal plate when electrical properties are sought.

It can be an elastomer, which will confer improved properties of acoustic filtration to the closing stopper of the invention, particularly when a honeycombed elastomer is used. In this case, the closing stopper also has improved friction properties, that is, sliding will be reduced.

If one wishes, on the other hand, to increase the sliding properties of the closing stopper, then a plate 7 consisting of polytetrafluoroethylene (PTFE) is used.

If one wishes to increase the rigidity of the closing stopper of the invention, a plate 7 is used which is made of a rigid plastic of the polyamide type or polyamide and propylene alloy type, for example.

The plate 7 can also consist of a hot melt composition containing an agent which expands at high temperature, preferably at a temperature equal to the minimum temperature of the currently used ovens, that is 140° C.; this type of closing stopper can be made, for example, by coextrusion of the plate 7 and the film 8.

In all cases, after the passage through the oven, the adhesion is carried out thanks to the melting of the adhesive component and its subsequent hardening.

The closing stopper of the invention will preserve an acceptable shape as shown in FIG. 7 thanks to the framework forming component, after the passage through the oven.

Although the invention was described with reference to embodiment examples of a stopper having a cylindrical closing shape, it is in no way limited to these examples. Thus, because of the excellent properties of suitability to molding of the composition of the invention, the closing stopper can also assume any shape other than the described cylindrical shape.

In addition, the thermogluing composition of the invention clearly can be used for manufacturing any other part besides a closing stopper and for other another use, for example, like the manufacture of food packaging films or to effect acoustical insulation of parts without any opening.

In the same manner, the time/temperature pairs given here are those currently used, but, as already indicated, these pairs could be modified as long as the properties of adhesion and preservation of shape of the parts manufactured from the compositions of the invention will be maintained.

Accordingly, the composition of the invention can have numerous applications which will be readily apparent to an ordinary person skilled in the art.

What is claimed is:

1. A thermogluing composition comprising an adhesive component and a framework forming component wherein:
    a) the adhesive component is chosen from the group consisting of
        a polymer of ethylene-vinyl acetate (EVA)-maleic anhydride, optionally modified with polyethylene or polypropylene, and
        a polymer of ethylene-vinyl acetate (EVA) modified to have epoxy functions, and
    b) the framework forming component is chosen from the group consisting of
        an ester block polyether (COPE) and,
        an amine block polyether (PEBA) optionally in a mixture with a copolymer of ethylene-propylene, said copolymer of ethylene-propylene optionally being at least partially replaced by a terpolymer of ethylene-propylene-diene (EPDM).

2. The thermogluing composition according to claim 1, including said polymer of ethylene-vinyl acetate-maleic anhydride containing 0.5–40 wt % of vinyl acetate units and 0.05–15 wt % of maleic anhydride, the remainder being ethylene.

3. The thermogluing composition according to claim 1, including said polymer of ethylene-vinyl acetate-maleic anhydride containing 5–25 wt % of vinyl acetate units and 0.5–10 wt % of maleic anhydride, the remainder being ethylene.

4. The thermogluing composition according to claim 1, including said copolymer of ethylene-vinyl acetate-maleic anhydride containing 14 wt % of vinyl acetate units and 0.5–1 wt % of maleic anhydride, the remainder being ethylene.

5. The thermogluing composition according to claim 1, including said polymer of ethylene-vinyl acetate-maleic anhydride wherein said polymer of ethylene-vinyl acetate-maleic anhydride is a copolymer of ethylene-vinyl acetate grafted with maleic anhydride.

6. The thermogluing composition according to claim 1, including said polymer of ethylene-vinyl acetate modified to have epoxy functions, the epoxy functions being contributed by one of glycidyl methacrylate, an acrylic acid, and methacrylic acid.

7. The thermogluing composition according to claim 6, including 1–10 wt % of glycidyl methacrylate.

8. The thermogluing composition according to claim 1, wherein said framework forming component is an ester block polyether (COPE) having an ester part consisting of the poly(butylene terephthalate) (PBTP) and an ether part consisting of at least one of ethylene glycol and propylene glycol units.

9. The thermogluing composition according to claim 8, wherein the ratio by weight between said adhesive component and said ester block polyether is 60:40.

10. The thermogluing composition according to claim 1, wherein said framework material is a mixture of PEBA and at least one of a copolymer of ethylene-propylene and a terpolymer of ethylene-propylene-diene, and PEBA consists of nylon-6 blocks and ether segments based on at least one of ethylene glycol an propylene glycol, and the diene of the terpolymer of ethylene-propylene-diene, when present, is butadiene.

11. The thermogluing composition according to claim 10, wherein the ratio by weight between said adhesive component and said framework forming component is 75:25.

12. The thermogluing composition according to claim 1, wherein the ratio by weight between said adhesive component and said framework forming component is between 80:20 and 70:30.

13. The thermogluing composition according to claim 1, including additives selected from the group consisting of resins which confer stickiness to the touch, fire retardant agents, reinforcement agents, antistatic agents, antifungicides, antioxidants, stabilizers to light and heat, dyes, fillers, and mixtures thereof.

14. The thermogluing composition according to claim 1, including a resin which confers stickiness to the touch at cold temperatures.

15. The thermogluing composition according to claim 14, wherein said resin which confers a stickiness to the touch at cold temperature is a glycol ester resin.

16. The thermogluing composition according to claim 15, wherein said glycol ester resin is one of a diethylene glycol ester, a dipropylene glycol ester, and a glycol ester derivative of colophony.

17. The thermogluing composition according to claim 14, containing 0.2–10 wt % of said resin, with reference to the total weight of the composition.

18. A stopper for closing an opening of a support, including a plate larger than the opening to be closed, having a melting and/or decomposition temperature which is higher than a maximum temperature used to glue the stopper to the support and wherein the plate is coated over at least one face with a film comprising the composition according to claim 14.

19. The stopper according to claim 18, wherein the plate is formed from a composition comprising an adhesive component and a framework forming component wherein:
 a) the adhesive component is chosen from the group consisting of
  a polymer of ethylene-vinyl acetate (EVA)-maleic anhydride, optionally modified with polyethylene or polypropylene, and
  a polymer of ethylene-vinyl acetate (EVA) modified to have epoxy functions; and
 b) the framework forming component is chosen from the group consisting of
  an ester block polyether (COPE), and
  an amine block polyether (PEBA) optionally in a mixture with a copolymer of ethylene-propylene, said copolymer of ethylene-propylene optionally being at least partially replaced by a terpolymer of ethylene-propylene-diene (EPDM).

20. The stopper according to claim 18, wherein the plate is a material chosen from the group consisting of a metal, an elastomer, a honeycombed elastomer, a rigid plastic, polytetrafluoroethylene, and a hot melt composition containing an expansion agent which decomposes at a temperature of at least 140° C.

21. The stopper according to claim 18, wherein the plate has a thickness of 0.5–5 mm and the film has a thickness of 0.3–3 mm.

22. A stopper for closing an opening of a support comprising a composition according to claim 1.

23. The stopper according to claim 22 comprising a surface having dimensions which are larger than those of the opening to be closed as well as means for hooking, insertable into the opening.

24. The stopper according to claim 22, wherein the support is a metal support.

* * * * *